Patented Sept. 27, 1927.

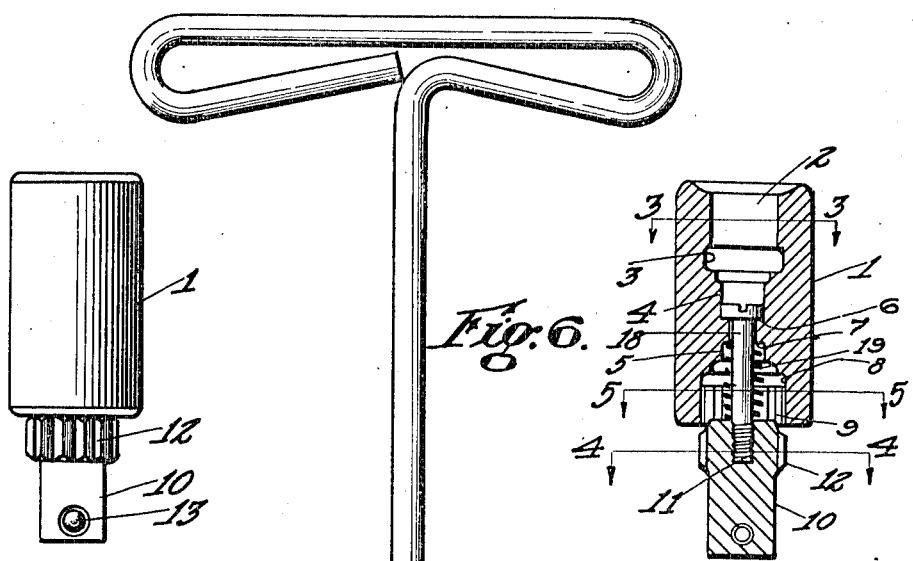
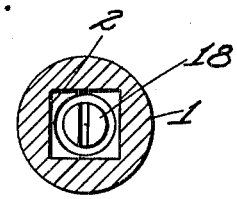
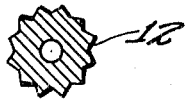
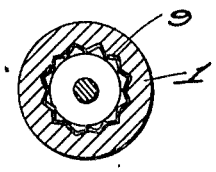
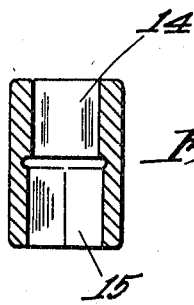

1,643,860

UNITED STATES PATENT OFFICE.

CHARLES A. SHEDD, OF WORCESTER, MASSACHUSETTS, ASSIGNOR TO WALDEN-WORCESTER, INCORPORATED, OF WORCESTER, MASSACHUSETTS, A CORPORATION OF MASSACHUSETTS.

SOCKET WRENCH.

Application filed July 14, 1926. Serial No. 122,453.

The invention relates to disengageable clutching devices for socket wrenches adapted to turn a bolt or nut by small oscillatory movements of a handle member. The object of the invention is to improve this class of wrenches by providing clutching elements with a diameter no greater than that of a small size interchangeable socket unit, to eliminate shearing strains in the clutching parts in order that the wrench may have a strength equal to or greater than that of former wrenches of this type; and to greatly reduce the expense of making these articles by eliminating milled teeth and employing instead teeth that can be broached.

Other and further advantages of the invention will appear in the following description.

In the drawings:

Fig. 1 is an elevation of a clutching unit built in accordance with my invention.

Fig. 2 is a longitudinal sectional view of said unit.

Figs. 3, 4 and 5 are horizontal sectional views on the lines 3—3, 4—4 and 5—5 respectively, of Fig. 2.

Fig. 6 is an elevation, on a smaller scale, of a suitable wrench handle.

Fig. 7 is a longitudinal sectional view on the same scale as Figs. 1 to 5, of an interchangeable socket unit.

Like reference characters refer to like parts in the different figures.

Referring to Figs. 1, 2 and 3, a cylindrical member 1 is formed at the upper end with a square recess 2. The member 1 can be easily turned from cold rolled stock on a screw machine. To produce the recess 2, the screw machine is caused to drill the member with a hole, the diameter of which is equal to a side of the square recess to be formed. Also, the member 1 is internally undercut at 3. A simple broaching operation will now finish the polygonal recess 2. The screw machine is also caused to drill a small hole right through the member 1. Then from each end a drill enters and produces portions 4 and 5 of slightly larger diameter, leaving a pair of shouldered portions 6, 7. The lower portion of the member 1 is likewise drilled out and an undercut portion produced at 8. Internal teeth 9 are formed in the member 1 by a broach, the shape of these teeth being best shown in Fig. 5.

A member 10 may likewise, and desirably, be formed on a screw machine out of cold rolled stock, said member being drilled and tapped at 11 by the screw machine. Subsequently, this member is forced by a press through a broaching die, leaving teeth 12 thereon. The lower portion of the member 10 is slabbed off by milling cutters, or in any other suitable manner, to give a polygonal shape, desirably square. At 13, a spring pressed ball is disposed in a recess formed in one flat side of the member 10, forming a friction clamp to hold a socket unit.

Figure 7 shows a socket unit, by way of example, a plurality of units being of course provided in each tool kit. Each socket has a square recess 14, adapted to fit on the square portion of the member 10. Each socket also has a nut engaging recess 15 of varying sizes and shapes. Fig. 6, also by way of example, shows one type of wrench handle having a square portion 16, with a spring pressed ball 17, adapted to fit in the recess 2. The wrench handles and socket units, being well known in the art, require no further description herein.

The member 10 is the movable element of the clutching means, and is held in place by means of a screw 18, the head of which is normally in engagement with the shoulder 7 on account of a spring 19, which thrusts against the member 10 at one end, and against the shoulder 7 at the other end.

To operate the device, the clutching unit is placed between any suitable handle and socket unit, and the nut receiving portion 15 placed over the nut or bolt head to be turned. The handle is then forced downward, and slightly turned, if the teeth 9 do not immediately engage with the teeth 12. As soon as the parts are clutched, the nut can be turned, and when the limit of movement is reached, the parts may be unclutched, the handle swung back and the operation repeated.

When employing twelve teeth, as shown, it is obvious that an angular movement of thirty degrees is sufficient to manipulate the wrench. The angular turn needed can, of course, be diminished by increasing the number of teeth.

As shown in Figs. 4 and 5, the dihedral angle between the faces of the teeth has been made obtuse, thereby to eliminate practically all shearing strains, and substitute a compressing action. Also triangular teeth of this type can be broached with greater accuracy, but the particular angle shown is not to be construed as the essence of the invention.

From the foregoing it will be seen that the clutching unit for socket wrenches of my invention can be very cheaply made, yet it possesses great strength, due to the use of flat sided, compression type of teeth in both of the clutching members. Also, due to the decreased diameter, made possible by the aforesaid improvement in type of teeth employed, the device will fit in smaller openings and take less room in a tool bag.

I claim:

1. In a device of the class described, a handle fitting element, a socket fitting element, there being internal teeth on the first named part, and external teeth on the second named part, and there being a hole through said handle fitting element, and a shoulder in said hole, a screw received in said socket fitting element with the head of said screw normally against said shoulder, and a spring surrounding said screw.

2. In a device of the class described, a handle fitting element, there being internal triangularly shaped teeth in said handle fitting element, a socket fitting element, there being external triangularly shaped teeth on said fitting element, the said external teeth being adapted to fit in clutching engagement with the said internal teeth, an undercut portion in the handle fitting element beyond the internal teeth, and a socket fitting portion of reduced size beyond the external teeth on the socket fitting element, whereby both sets of teeth may be cut with a broach.

Dated this tenth day of July, 1926.

CHARLES A. SHEDD.